United States Patent
Afzal et al.

(10) Patent No.: US 11,252,556 B2
(45) Date of Patent: Feb. 15, 2022

(54) CONTENT FILTERING FOR PACKET DATA NETWORK GATEWAY (PGW) AND SESSION MANAGEMENT FUNCTION (SMF) SELECTION

(71) Applicant: T-Mobile USA, Inc., Bellevue, WA (US)

(72) Inventors: Muhammad Waqar Afzal, Bellevue, WA (US); Suliman Albasheir, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/919,813

(22) Filed: Jul. 2, 2020

(65) Prior Publication Data

US 2022/0007170 A1 Jan. 6, 2022

(51) Int. Cl.
| | |
|---|---|
| *H04W 8/18* | (2009.01) |
| *H04W 8/08* | (2009.01) |
| *H04W 88/16* | (2009.01) |
| *H04M 15/00* | (2006.01) |
| *H04W 48/16* | (2009.01) |

(52) U.S. Cl.
CPC ........... *H04W 8/183* (2013.01); *H04M 15/66* (2013.01); *H04W 8/08* (2013.01); *H04W 48/16* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 2014/0029615 A1* | 1/2014 | Baldwin | H04L 67/2828 370/392 |
| 2015/0215186 A1* | 7/2015 | Franco | H04W 12/082 709/224 |
| 2016/0371045 A1* | 12/2016 | Munn | G06F 3/1415 |
| 2018/0220478 A1* | 8/2018 | Zhu | H04W 76/12 |
| 2019/0313319 A1* | 10/2019 | Qiao | H04L 12/14 |
| 2019/0335392 A1* | 10/2019 | Qiao | H04W 76/27 |
| 2021/0083965 A1* | 3/2021 | Taft | H04L 1/0016 |
| 2021/0120408 A1* | 4/2021 | Pazhyannur | H04W 8/183 |

* cited by examiner

*Primary Examiner* — German Viana Di Prisco
(74) *Attorney, Agent, or Firm* — Loeb & Loeb LLP (57) ABSTRACT

A method and system for content filtering. A network repository function unit registers a session management function unit. The session management function unit initiates a session in response to a session request from a user equipment. The session management function unit accesses a subscriber profile stored by a data management unit, and the subscriber profile includes one or more content filtering settings. In response to the session being established, the session management function unit is configured to determine data packets for the user equipment to be filtered based on the one or more content filtering settings. Absent triggering an instruction to be sent via a Gx interface, an access and mobility management function (AMF) unit is configured to select the session management function unit in compliance with the one or more content filtering settings for filtering the data packets for the user equipment.

18 Claims, 8 Drawing Sheets

CONTENT FILTERING FOR PACKET DATA NETWORK GATEWAY (PGW) AND SESSION MANAGEMENT FUNCTION (SMF) SELECTION

TECHNICAL FIELD

Embodiments discussed herein generally relate to content filtering in communications network.

BACKGROUND

Data packets, text messages, etc., over a network traverse a multitude of nodes. At any given point of time, content therein may need to be filtered or reviewed before it reaches the intended recipient.

Under existing 3G, or Long-Term Evolution (LTE), one of the nodes that handles content filter is a Policy and Charging Rules Function (PCRF) server, which is a node that functions in real-time to determine policy rules in a multimedia network. As a policy tool, the PCRF plays a central role in networks/LTE. It is a component that operates at the network core and accesses subscriber databases and other specialized functions, such as a charging system, in a centralized manner. The PCRF has an increased strategic significance and broader potential role, than traditional policy engines, due to its working in real time.

That node is typically a specific hardware or server device that processes the PCRF requests in the 4G environment. In the new 5G environment, there are two infrastructures: a standalone and a non-standalone (NSA). The NSA environment relies partly on the existing 4G infrastructure and brings the 5G new radio (NR), such as millimeter wave (mmWave) technology. However, in a 5G environment, the approach of the PCRF under the standalone infrastructure would significantly limit the potential of the 5G infrastructure.

Therefore, to overcome the above shortcomings, embodiments attempt to create a technical solution to address the deficiencies of the challenges above.

SUMMARY

Embodiments create a technical solution to the above challenges by enabling a software solution in a 5G standalone infrastructure. Instead of implementing content filtering in the Gx interface between the packet data network gateway (PGW)/Gateway GPRS Serving Node (GGSN) and PCRF section, embodiments of the invention attempt to apply it in the access and mobility management function (AMF) unit or the mobility management entity (MME) unit for configuring the content filtering.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

In a 5G network, network functions that typically run on hardware become virtualized, running as software. Before 5G networks reach their full potential and become self-sufficient, most carriers will be using existing 4G LTE radio access networks (RANs) augmented with some new antennas in the non-standalone (NSA) infrastructure. This allows carriers to begin offering improved services while the new physical infrastructure is built.

However, in a standalone 5G infrastructure, a fundamental element of the infrastructure is a Service-Based Architecture (SBA) having a standard application programming interface (API) via HTTP/JSON, for example.

Figure 1:
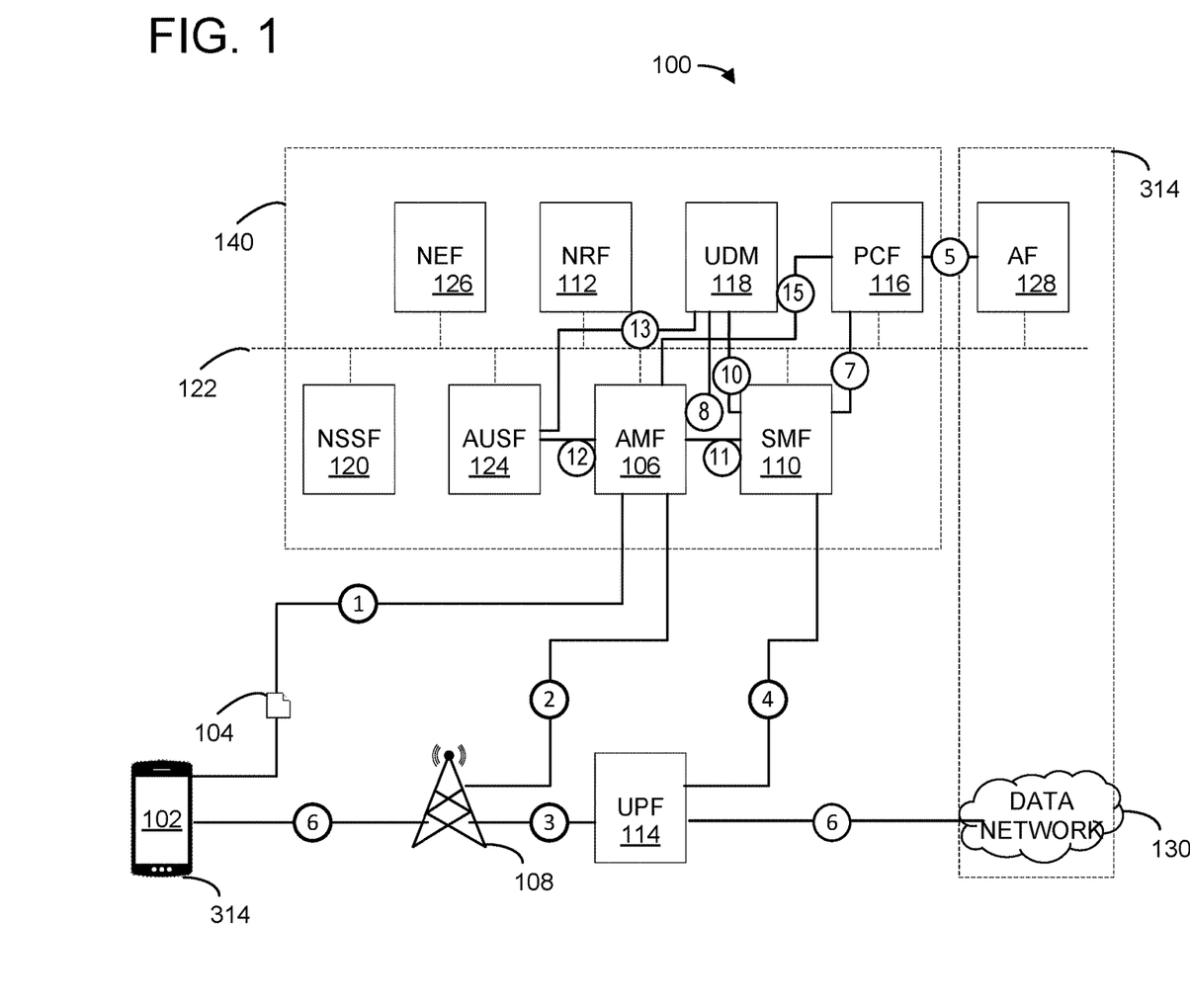
FIG. 1 is a diagram illustrating an exemplary 5G standalone infrastructure according to one embodiment.

To further illustrate aspects of the invention, FIG. 1 is a diagram illustrating a system 100 for content filtering according to one embodiment. For example, in a very brief overview, the system 100 may be a 5th Generation (5G) (or New Radio (NR)) network of the 3GPP Wireless Communication Standard, and/or may include elements of a 5G network in a standalone infrastructure. For example, a user equipment (UE) 102 may start or initiate a given session with a data packet or message 104 to be sent to an access and mobility management function (AMF) unit 106 via path 1 or 202 in FIG. 2. In one embodiment, a new base station (gNB or gNodeB) 108 may also initiate a request to the AMF unit 106 to begin the session.

Figure 5:
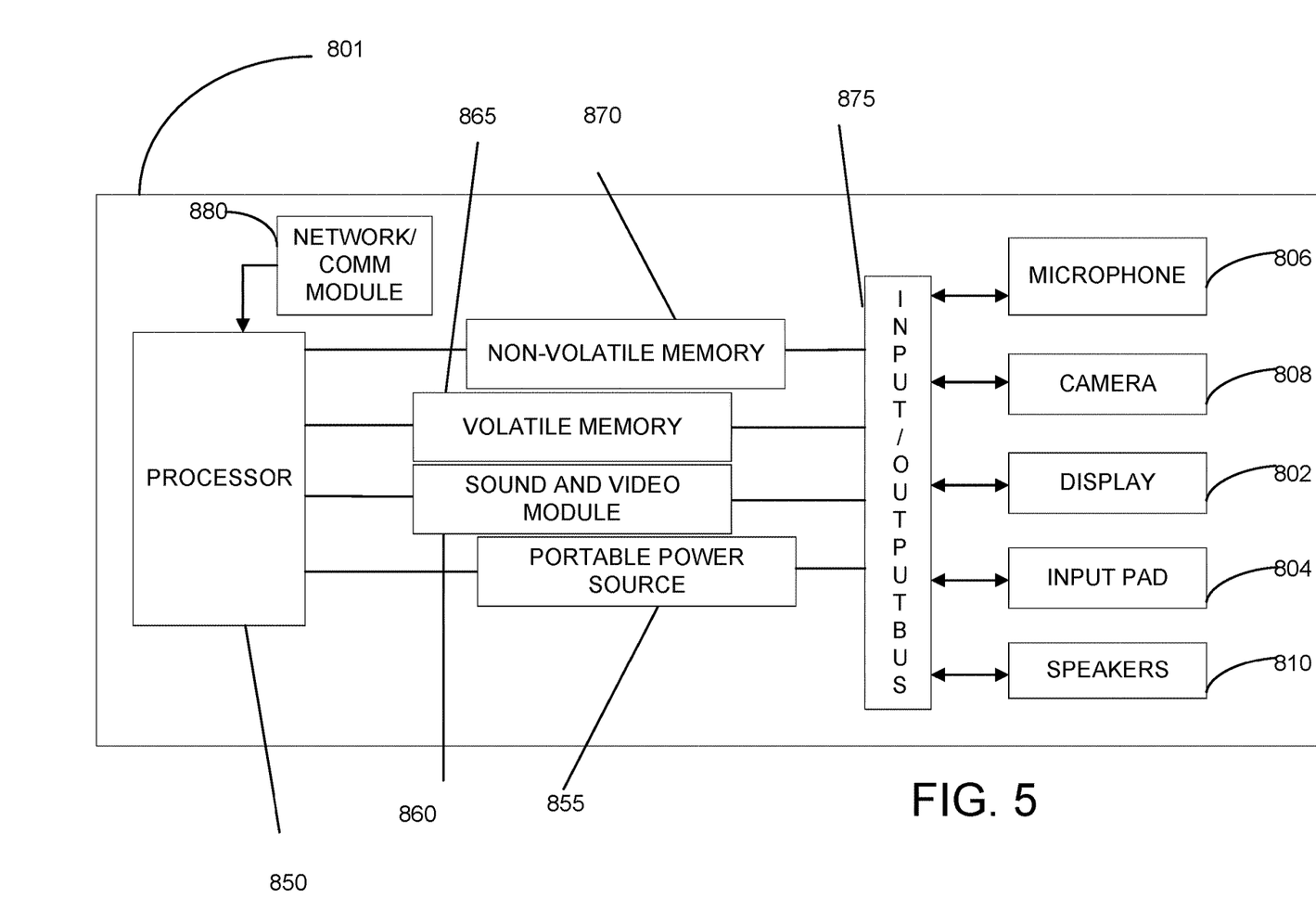
FIG. 5 is a diagram illustrating a portable computing device according to one embodiment.

In one example, the UE 102 may be a mobile device 801, which is further illustrated in FIG. 5. In one embodiment, the UE 102 may be a smartphone, a tablet, a smartwatch, etc. In another embodiment, the AMF unit 106 may receive these requests and handles anything that has to do with connection or mobility management. In one embodiment, the AMF unit 106 may not process session management types of messages. Rather, the AMF unit 106 may forward these messages to a session management function (SMF) unit 110 via path 11 or 204 and 206. In one embodiment, a network repository function (NRF) unit 112 may assist the AMF unit 106 regarding what kind of messages are forwarded. For example, the AMF unit 106 may at 204 determine which message may be best suited to handle the connection request by querying the NRF unit 112. The functional connection between the NRF unit 112 and the SMF unit 110 may be triggered so that the message may be forwarded.

Figure 2:
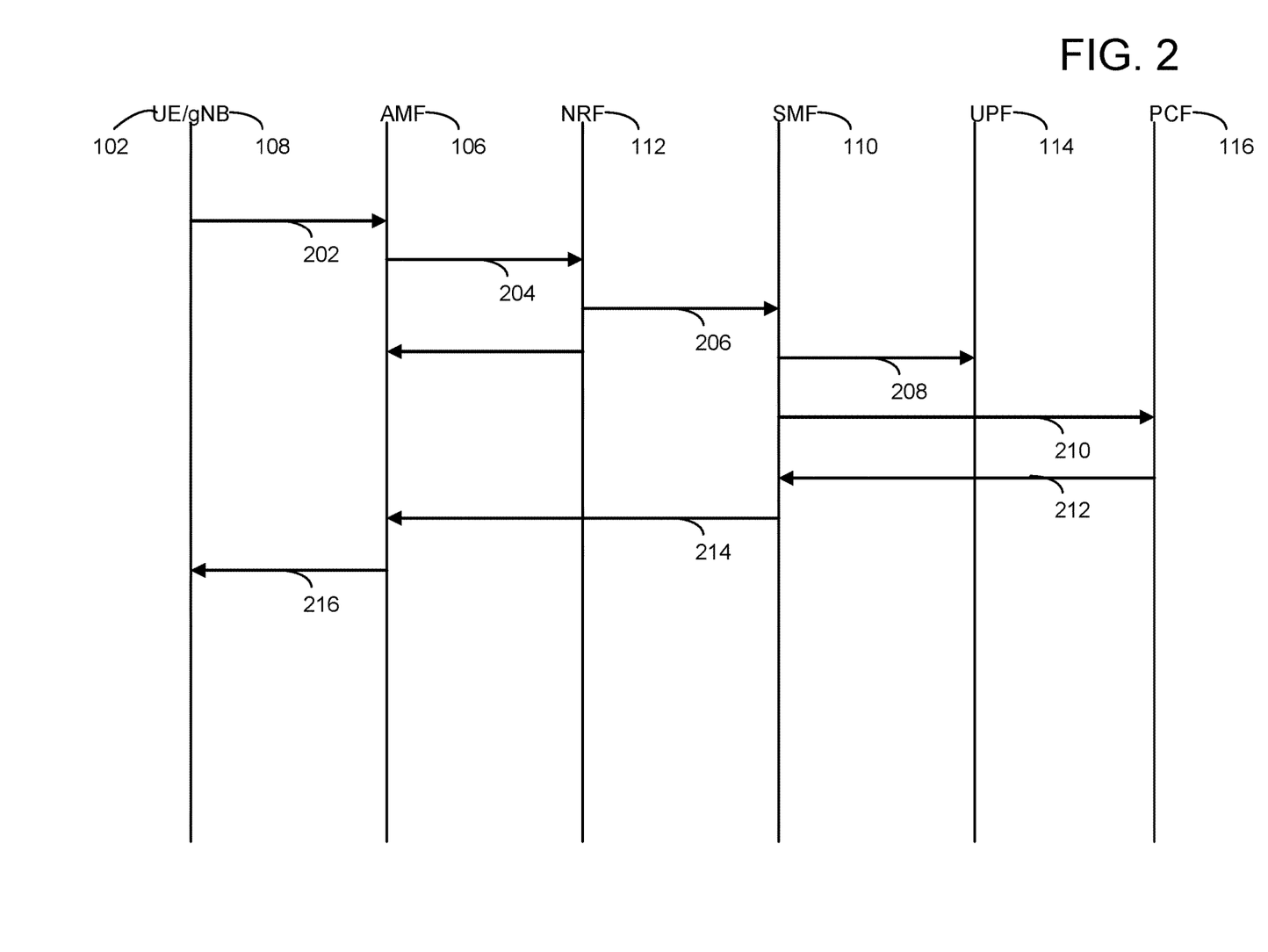
FIG. 2 is a diagram illustrating a flow diagram according to one embodiment.

For example, the NRF unit 112 may be configured to perform the functions of network functions (NF) that may provide service registration and discovery, enabling NFs to identify appropriate services in one another in the 5G infrastructure. In one example, messages received over the path 11 or 204 and 206 may represent a trigger to add, modify or delete a PDU session across a user plane. The SMF unit 110 may send messages to a user plane function (UPF) 114 over a path 4 or 208 reference interface using a Packet Forwarding Control Protocol (PFCP).

To further focus on aspects of the invention, the SMF unit 110 may during a session establishment or modification also interact with a Policy Control Function (PCF) unit 116 over interface and a subscriber profile information stored within a Unified Data Management (UDM) unit 118 function via path 10 or 210, which may the role previously performed by a hardware device, home subscriber server (HSS), under the previous 4G infrastructure. Employing a service base interface (SBI) message bus 122, the PCF unit 116 may provide the foundation of a policy framework which, along with the more typical QoS and charging rules, includes Network Slice selection, which is regulated by a Network Slice Selection Function (NSSF) unit 120.

Still referring to FIG. 1, the system 100 may further include an authentication server function (AUSF) 124, a network exposure function (NEF) 126, an application function (AF) 128, and a data network 130. As previously discussed, the 5G standalone infrastructure may fully exploit the service-based architecture (e.g., software based functions 140) so that these functions are performed via software implementations.

The AMF unit 106 may be able to select SMF/UPF or PGW based on the content filtering parameters, settings, or rules. Aspects of the invention may enable a selection of a SMF 100 based on content filtering by the AMF unit 106.

For example, the 5G infrastructure may decouple PGW control and user plane functions and may enable the data forwarding component (PGW-U) (e.g., user plane) to be decentralized. This feature may enable packet processing and traffic aggregation to be performed closer to a network edge, increasing bandwidth efficiencies while reducing network. On the control plane functions, the PGWs handling signaling traffic (PGW-C) remain in the core and interfacing with SMF unit 110 or even with a Mobility Management Entity (MME).

Figure 3A:
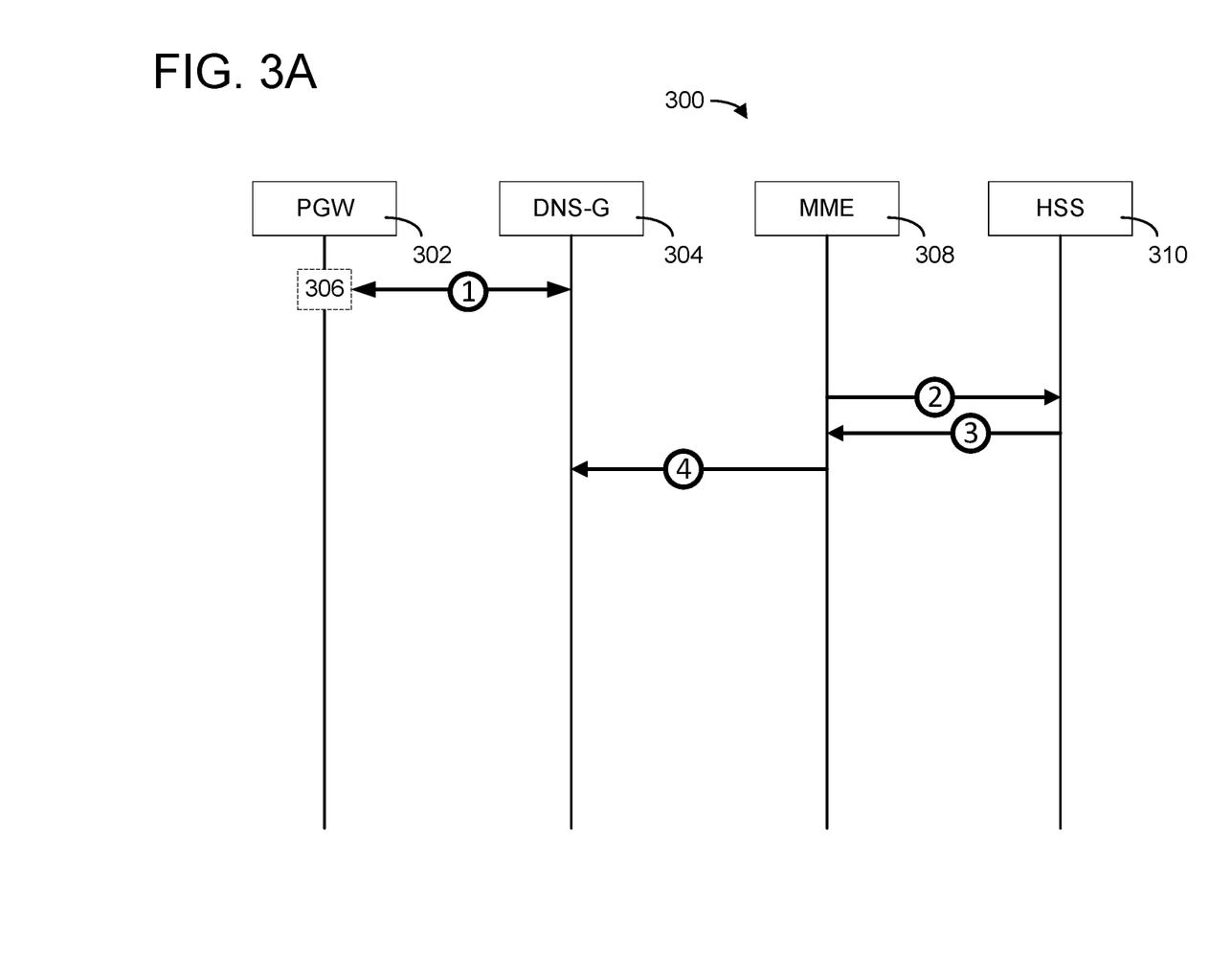
FIG. 3A is a diagram illustrating content filtering in a LTE infrastructure according to one embodiment.
Figure 3B:
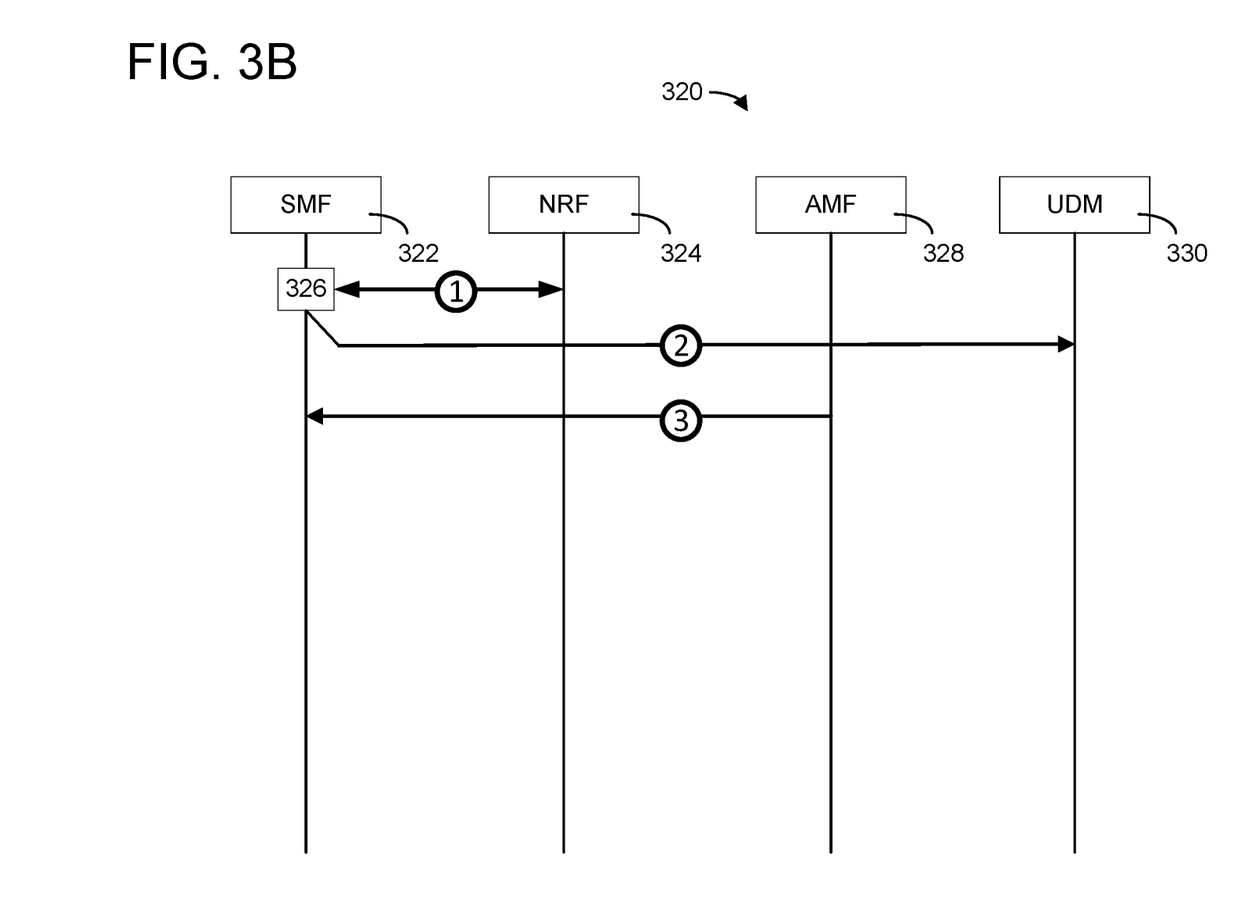
FIG. 3B is a diagram illustrating content filtering in 5G standalone infrastructure according to another embodiment.

For example, referring now to FIGS. 3A and 3B, diagrams may illustrate how PGWs may be selected for content filtering. For example, FIG. 3A may illustrate a diagram 300 having the NSA infrastructure which builds on LTE. In such an example, CF-PGW 302 may be selected from MME 308 in the LTE networks. In such configurations, a PGW 302 may be configured in a DNS gateway (DNS-G) 304 with an extra service tag 306 at 1. In one example, this tag 306 may represent or indicate if the gateway 304 is capable of handling content filtering traffic.

The MME 308 may retrieve or fetch, at 2, a user profile from a Home Subscriber Server (HSS) 310. In one example, the user profile may include the content filtering rules or details. For example, the content filtering rules may include a set of profile parameters that have different levels. For example, the parameter may include levels for different age groups, such as children, teenager, adult, and/or elderly.

Once retrieved at 3, the MME 308 may select the gateway 304 that satisfy the content filtering requirements based on the user profile fetched from the HSS 310 and the PGW 302. By such selection, the content filtering is accomplished.

Referring now to FIG. 3B, a diagram 320 may illustrate how content filtering according to one embodiment in the 5G environment. In one example, a SMF 322 may be registered with content filtering information 326 to a NRF 324 at 1. At 2, a user profile may be configured in a UDM 330 with the content filtering information 326. When time comes for content filtering to be activated, an AMF 324 may select the SMF 322 based on the content filtering information 326. In one embodiment, the selection of the SMF 322 may also be based on other parameters, such as Data Network Name (DNN), Tracking Area Identity (TAI), etc.

Unlike prior practice that performs content filtering between PGW or gateway GPRS support network (GGSN) and PCRF on a Gx interface, aspects of the invention enable content filtering from SMF 110 without adding any additional hardware, as illustrated in FIG. 3B. For example, parents may wish to filter offensive contents for their children. As a result, the parents may configure in a subscriber profile with settings to filter contents for their children. Based on the subscriber/user profile, which may be stored in UDM 118, the SMF 110 may extract the content filtering configurations or settings. In response to the content filtering, the AMF unit 106 may select a SMF 110 to filter contents for the UE 102.

Figure 4A:
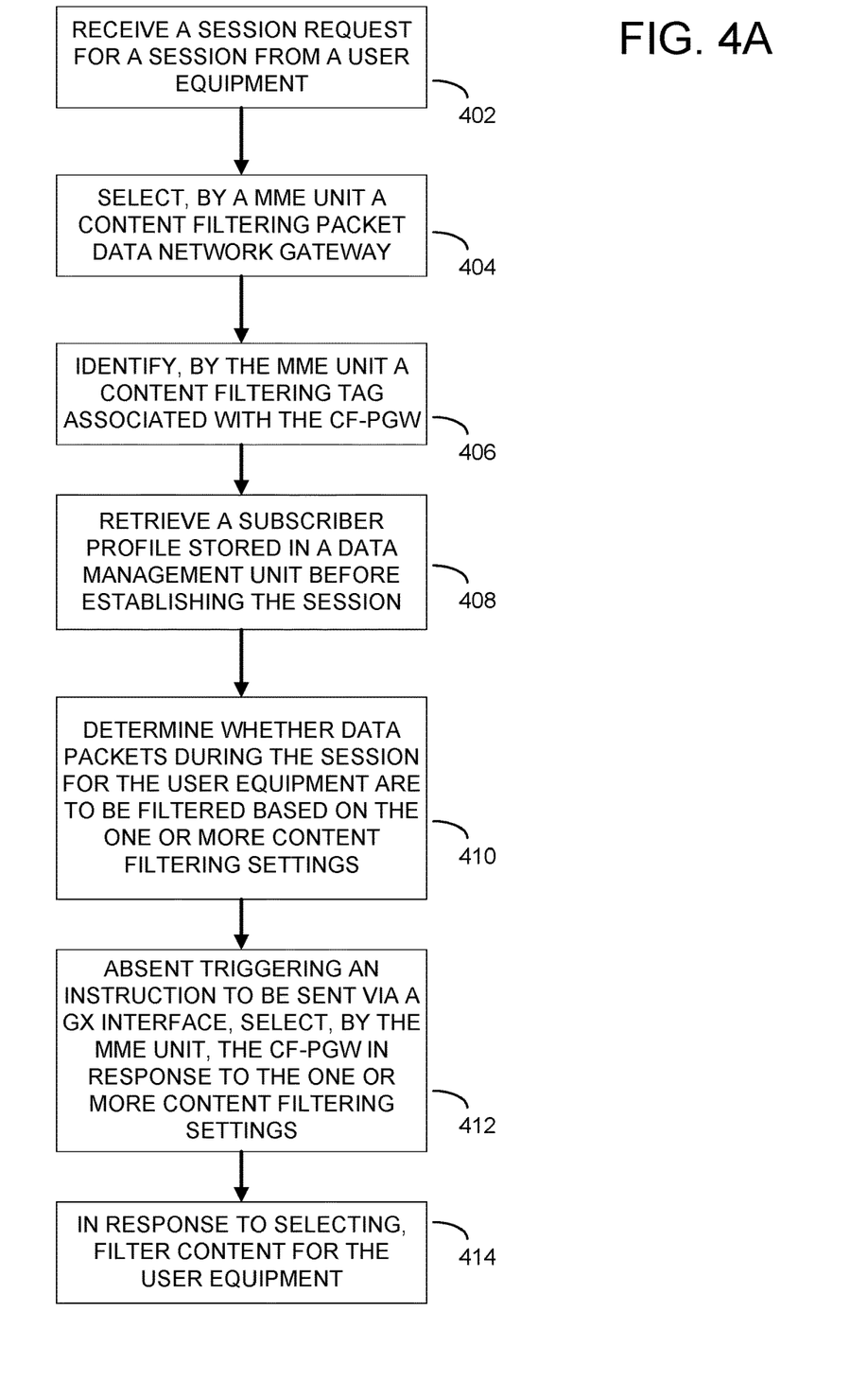
FIG. 4A is a flow chart illustrating a method according to one embodiment.

Referring now to FIG. 4A, a flow chart illustrates a method according to one embodiment. In one embodiment, the method is implemented in an LTE environment. At 402, a session request is received from a user equipment. At 404, a MME unit may select a content filtering packet data network gateway (CF-PGW). At 406, the MME unit may identify a content filtering tag associated with the CF-PGW. At 408, the MME unit may retrieve a subscriber profile stored in a data management unit before establishing the session. The subscriber profile, in one embodiment, may include one or more content filtering settings. At 410, in response to the session being established, the MME unit may determine whether data packets during the session for the user equipment are to be filtered based on the one or more content filtering settings. At 412, absent triggering an instruction to be sent via a Gx interface, selecting, by the MME unit, the CF-PGW in response to the one or more content filtering settings. At 414, in response to the filtering, the MME unit may filter the content for the user equipment.

Figure 4B:
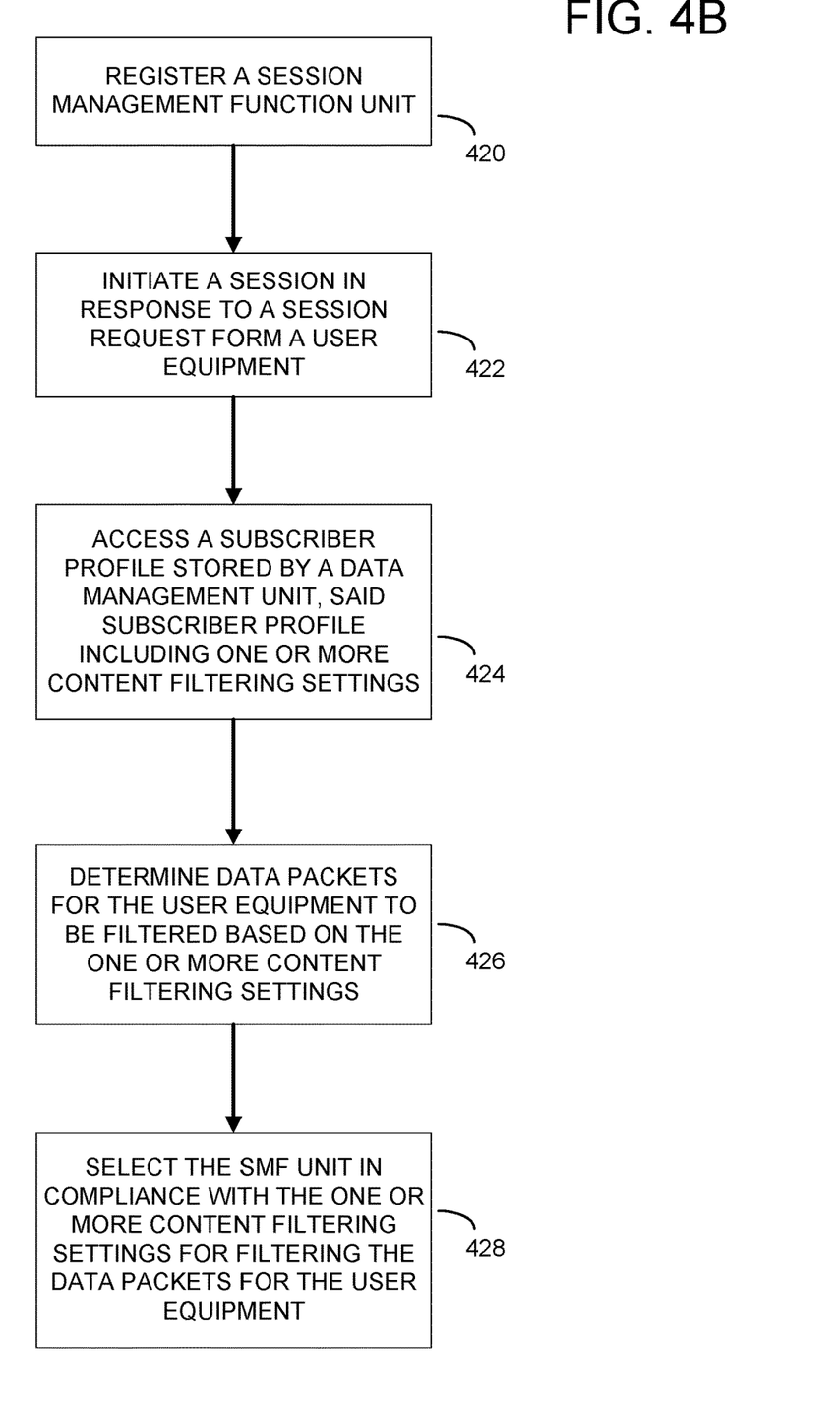
FIG. 4B is another flow chart illustrating a method according to one embodiment.

Referring now to FIG. 4B, another flow chart illustrating another method according to one embodiment. At 420, a network repository function (NRF) unit may be configured to register a session management function (SMF) unit. At 422, the SMF unit may be configured to initiate a session in response to a session request from a user equipment. At 424, in one embodiment, the SMF unit may access a subscriber profile stored by a data management unit. The subscriber profile may include one or more content filtering settings.

At 426, in response to the session being established, the SMF unit may further configure to determine data packets for the user equipment to be filtered based on the one or more content filtering settings. At 428, absent triggering an instruction to be sent via a Gx interface, an AMF unit may be configured to select the session management function unit in compliance with the one or more content filtering settings for filtering the data packets for the user equipment.

Figure 6:
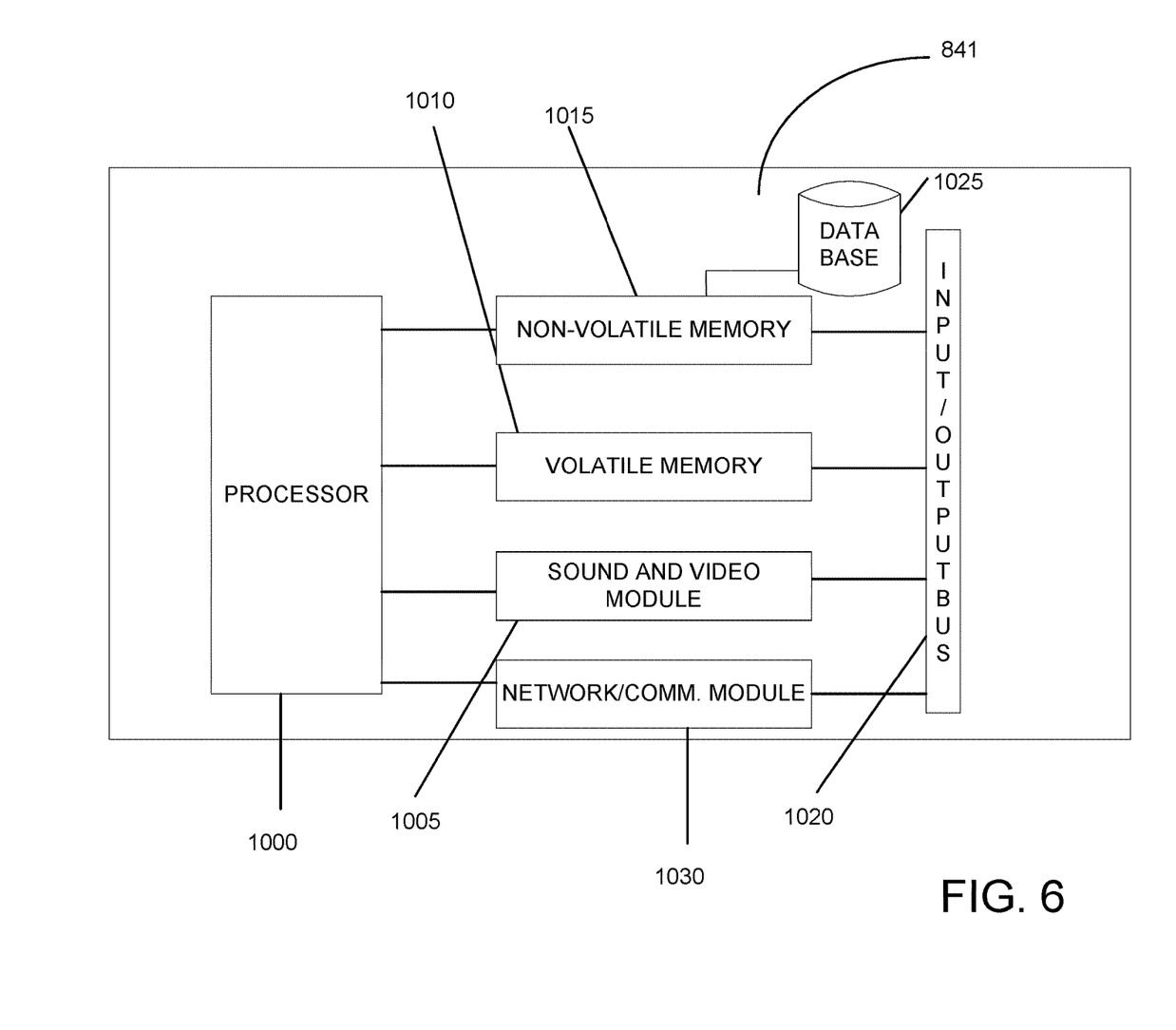
FIG. 6 is a diagram illustrating a computing device according to one embodiment.

FIG. 5 may be a high level illustration of a portable computing device 801 communicating with a remote computing device 841 in FIG. 6 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network such as cellular service, through the Internet, through a private network, through BLUETOOTH, etc., via a network or communication module 880.

FIG. 5 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 870 and volatile memory 865. The network or communication module 880 may have GPS, BLUETOOTH, NFC, cellular or other communication capabilities. In one embodiment, some or all of the network or communication capabilities may be separate circuits or may be part of the processor 850. There also may be an input/output bus 875 that shuttles data to and from the various user input devices such as the microphone 806, the camera 808 and other inputs, such as the input pad 804, the display 802, and the speakers 810, etc. It also may control communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 6. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 may also connect to similar devices of the microphone 806, the camera 808, the inputs such as the input pad 804, the display 802, and the speakers 810, or other peripheral devices, etc. The input/output bus 1020 also may interface with a network or communication module 1030 to control communicating with other devices or computer networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein (e.g., 801 or 841) may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods overcome challenges of relying on existing practices of content filtering-a hardware solution. Rather, with the flexibility and decoupling of the user plane and the control plane, aspects of the invention may more efficiently accomplish content filtering without being tied to hardware-dependent.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A system comprising:
  a network repository function unit configured to register a session management function unit;
  a session management function unit configured to initiate a session in response to a session request from a user equipment;
  wherein the session management function unit accesses a subscriber profile stored by a data management unit, said subscriber profile including one or more content filtering settings;
  in response to the session being established, the session management function unit is configured to determine data packets for the user equipment to be filtered based on the one or more content filtering settings; and
  absent triggering an instruction to be sent via a Gx interface, an access and mobility management function (AMF) unit is configured to select the session management function unit in compliance with the one or more content filtering settings for filtering the data packets for the user equipment, wherein the AMF unit is configured to select another session management function unit in response to the data packets not being subjected to the one or more content filtering settings.

2. The system of claim 1, wherein the session management function unit is configured to be a software-based program.

3. The system of claim 1, further comprising a policy control function unit for interfacing with the data management unit.

4. The system of claim 1, wherein the one or more content filtering settings are configured by a subscriber.

5. The system of claim 1, wherein the session request comprises a session request under a 5G standalone infrastructure.

6. The system of claim 1, wherein the instruction may include a parameter SN-CF-POLICY-ID.

7. A computer-implemented method comprising:
receiving a session request for a session from a user equipment;
selecting by a mobility management entity unit a content filtering packet data network gateway;
identifying a content filtering tag associated with the content filtering packet data network gateway;
retrieving a subscriber profile stored in a data management unit by the mobility management entity unit before establishing the session, said subscriber profile including one or more content filtering settings;
in response to the session being established, determining whether data packets during the session for the user equipment are to be filtered based on the one or more content filtering settings;
absent triggering an instruction to be sent via a Gx interface, selecting, by the mobility management entity unit, the content filtering packet data network gateway in response to the one or more content filtering settings; and
in response to selecting, filtering content for the user equipment.

8. The computer-implemented method of claim 7, further comprising interfacing with the data management unit with a policy control function unit.

9. The computer-implemented method of claim 7, further comprising redirecting, by the mobility management entity unit, the data packets to another packet data network gateway when the data packets are not subjected to the one or more content filtering settings.

10. The computer-implemented method of claim 7, wherein the one or more content filtering settings are configured by a subscriber.

11. The computer-implemented method of claim 7, wherein the session request comprises a session request under a LTE infrastructure.

12. The computer-implemented method of claim 7, wherein the instruction may include a parameter SN-CF-POLICY-ID.

13. A tangible non-transitory computer-readable medium having stored thereon computer-executable instructions for content filtering processing comprising:
receiving a session request for a session from a user equipment;
identifying a session environment from the session request, said session environment includes an Long-Term Evolution (LTE) infrastructure and a 5G standalone infrastructure;
in response to the session environment being the LTE infrastructure:
selecting by a mobility management entity unit a content filtering packet data network gateway;
identifying a content filtering tag associated with the content filtering packet data network gateway;
retrieving a subscriber profile stored in a data management unit by the mobility management entity unit before establishing the session, said subscriber profile including one or more content filtering settings;
in response to the session being established, determining whether data packets during the session for the user equipment are to be filtered based on the one or more content filtering settings;
absent triggering an instruction to be sent via a Gx interface, selecting, by the mobility management entity unit, the content filtering packet data network gateway in response to the one or more content filtering settings; or
in response to the session being the 5G standalone infrastructure:
registering a session management function unit by a network repository function unit;
accessing, by the session management function unit, a subscriber profile stored by a data management unit, said subscriber profile including one or more content filtering settings;
in response to the session being established, determining, by the session management function unit, data packets for the user equipment to be filtered based on the one or more content filtering settings;
absent triggering the instruction to be sent via a Gx interface, selecting, by an access and mobility management function (AMF) unit, the session management function unit in compliance with the one or more content filtering settings for filtering the data packets for the user equipment.

14. The tangible non-transitory computer-readable medium of claim 13, further comprising interfacing with the data management unit with a policy control function unit.

15. The tangible non-transitory computer-readable medium of claim 13, further comprising redirecting, by the mobility management entity unit, the data packets to another packet data network gateway when the data packets are not subjected to the one or more content filtering settings.

16. The tangible non-transitory computer-readable medium of claim 13, further comprising selecting, by the AMF unit, another session management function unit in response to the data packets not being subjected to the one or more content filtering settings.

17. The tangible non-transitory computer-readable medium of claim 13, wherein the one or more content filtering settings are configured by a subscriber.

18. The tangible non-transitory computer-readable medium of claim 13, wherein the instruction may include a parameter SN-CF-POLICY-ID.

* * * * *